US007589857B2

(12) United States Patent
Oe

(10) Patent No.: US 7,589,857 B2
(45) Date of Patent: Sep. 15, 2009

(54) IMAGE FORMING APPARATUS AND ADDRESS INFORMATION PROCESSING METHOD

(75) Inventor: Takayasu Oe, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 900 days.

(21) Appl. No.: 10/832,283

(22) Filed: Apr. 27, 2004

(65) Prior Publication Data

US 2005/0002057 A1   Jan. 6, 2005

(30) Foreign Application Priority Data

| Apr. 28, 2003 | (JP) | ............................ 2003-123427 |
| Aug. 28, 2003 | (JP) | ............................ 2003-304983 |
| Apr. 16, 2004 | (JP) | ............................ 2004-122016 |

(51) Int. Cl.
- *G06K 15/00* (2006.01)
- *G06F 3/12* (2006.01)
- *H04N 1/00* (2006.01)
- *G06F 3/00* (2006.01)
- *G06F 17/30* (2006.01)

(52) U.S. Cl. .................... 358/1.16; 358/1.13; 358/1.15; 358/440; 715/739; 707/7; 707/8

(58) Field of Classification Search ................ 358/1.15, 358/3.28, 1.13, 1.16, 440, 1.14; 370/401, 370/392, 389, 215, 252; 709/201, 228, 225, 709/206, 218, 229, 217, 247, 224, 248; 379/242, 379/88.14, 88.11; 380/255; 707/3, 7.8; 700/223; 710/33; 705/8, 34, 1; 713/176; 209/217; 715/739

See application file for complete search history.

(56) References Cited

U.S. PATENT DOCUMENTS

| 5,317,568 | A | * | 5/1994 | Bixby et al. ................ 370/401 |
| 5,473,608 | A | * | 12/1995 | Gagne et al. ................ 370/401 |
| 5,517,622 | A | * | 5/1996 | Ivanoff et al. ............... 709/224 |
| 5,621,727 | A | * | 4/1997 | Vaudreuil .................... 370/401 |
| 5,706,509 | A | * | 1/1998 | Man-Hak Tso ............. 707/201 |
| 5,740,231 | A | * | 4/1998 | Cohn et al. .................. 370/401 |
| 5,761,201 | A | * | 6/1998 | Vaudreuil .................... 370/392 |
| 5,826,265 | A | * | 10/1998 | Van Huben et al. ............ 707/8 |
| 5,872,779 | A | * | 2/1999 | Vaudreuil .................... 370/401 |
| 5,982,856 | A | * | 11/1999 | Cohn et al. ............... 379/88.14 |

(Continued)

FOREIGN PATENT DOCUMENTS

JP    11-215339    8/1999

(Continued)

*Primary Examiner*—Twyler L Haskins
*Assistant Examiner*—Jonathan R Beckley
(74) *Attorney, Agent, or Firm*—Oblon, Spivak, McClelland, Maier & Neustadt, P.C.

(57) ABSTRACT

An image forming apparatus and an address book process request processing method are disclosed to improve access security to an address book. The image forming apparatus include an information storage part, a request receipt part and a request processing part. The information storage part stores an address book on users. The request receipt part receives process requests for the address book together with user identification information from users. The request processing part authenticates the users based on the received user identification information and performs operations corresponding to the process requests on the address book in accordance with access authority permitted to the users. The address book includes address information for transmitting data to the users via a network and management information having user identification information of the users.

22 Claims, 10 Drawing Sheets

U.S. PATENT DOCUMENTS

| | | | |
|---|---|---|---|
| 6,023,724 A * | 2/2000 | Bhatia et al. | 709/224 |
| 6,028,848 A * | 2/2000 | Bhatia et al. | 370/401 |
| 6,029,203 A * | 2/2000 | Bhatia et al. | 709/248 |
| 6,031,895 A * | 2/2000 | Cohn et al. | 379/88.11 |
| 6,108,330 A * | 8/2000 | Bhatia et al. | 370/401 |
| 6,108,727 A * | 8/2000 | Boals et al. | 709/247 |
| 6,151,624 A * | 11/2000 | Teare et al. | 709/217 |
| 6,253,326 B1 * | 6/2001 | Lincke et al. | 380/255 |
| 6,356,920 B1 * | 3/2002 | Vandersluis | 715/210 |
| 6,373,817 B1 * | 4/2002 | Kung et al. | 370/215 |
| 6,411,684 B1 * | 6/2002 | Cohn et al. | 379/88.14 |
| 6,487,600 B1 * | 11/2002 | Lynch | 709/229 |
| 6,553,410 B2 * | 4/2003 | Kikinis | 709/218 |
| 6,564,209 B1 * | 5/2003 | Dempski et al. | 707/3 |
| 6,580,966 B2 * | 6/2003 | Shimada | 700/223 |
| 6,636,499 B1 * | 10/2003 | Dowling | 370/389 |
| 6,654,807 B2 * | 11/2003 | Farber et al. | 709/225 |
| 6,715,003 B1 * | 3/2004 | Safai | 710/33 |
| 6,721,726 B1 * | 4/2004 | Swaminathan et al. | 707/3 |
| 6,732,152 B2 * | 5/2004 | Lockhart et al. | 709/206 |
| 6,754,181 B1 * | 6/2004 | Elliott et al. | 370/252 |
| 6,757,530 B2 * | 6/2004 | Rouse et al. | 455/412.1 |
| 6,789,126 B1 * | 9/2004 | Saulpaugh et al. | 709/201 |
| 6,801,340 B1 * | 10/2004 | Endo | 358/403 |
| 6,850,979 B1 * | 2/2005 | Saulpaugh et al. | 709/225 |
| 6,859,527 B1 * | 2/2005 | Banks et al. | 379/242 |
| 6,920,502 B2 * | 7/2005 | Araujo et al. | 709/225 |
| 6,956,663 B1 * | 10/2005 | Iida | 358/1.15 |
| 6,970,907 B1 * | 11/2005 | Ullmann et al. | 709/206 |
| 7,006,258 B2 * | 2/2006 | Hikichi | 358/3.28 |
| 7,020,774 B1 * | 3/2006 | Cornuejols et al. | 713/176 |
| 7,025,209 B2 * | 4/2006 | Hawkins | 209/217 |
| 7,065,574 B1 * | 6/2006 | Saulpaugh et al. | 709/225 |
| 7,079,275 B2 * | 7/2006 | Henry et al. | 358/1.15 |
| 7,117,170 B1 * | 10/2006 | Bennett et al. | 705/34 |
| 7,119,915 B2 * | 10/2006 | Tonegawa | 358/1.15 |
| 7,120,910 B2 * | 10/2006 | Matsuda et al. | 709/201 |
| 7,191,237 B2 * | 3/2007 | Jodra et al. | 709/228 |
| 7,212,985 B2 * | 5/2007 | Sciuk | 705/8 |
| 7,239,434 B2 * | 7/2007 | Endo | 358/474 |
| 7,243,356 B1 * | 7/2007 | Saulpaugh et al. | 709/225 |
| 7,382,473 B2 * | 6/2008 | Chohsa et al. | 358/1.13 |
| 7,515,289 B2 * | 4/2009 | Ohtuka | 358/1.15 |
| 2002/0138564 A1 * | 9/2002 | Treptow et al. | 709/203 |
| 2002/0186408 A1 * | 12/2002 | Nakaoka et al. | 358/1.15 |
| 2003/0149776 A1 * | 8/2003 | Tsunezumi | 709/228 |
| 2004/0093222 A1 * | 5/2004 | Sipe et al. | 705/1 |
| 2004/0212841 A1 | 10/2004 | Endo | |

FOREIGN PATENT DOCUMENTS

| | | |
|---|---|---|
| JP | 2001-285562 | 10/2001 |
| JP | 2001-312389 | 11/2001 |
| JP | 2002-016694 | 1/2002 |
| JP | 2002-033784 | 1/2002 |
| JP | 2002-288029 | 10/2002 |
| JP | 2002-297578 | 10/2002 |

* cited by examiner

FIG.3

| CATEGORY | ITEM | ORDINARY USER | USER ADMINISTRATOR | OWNER | OWNER GROUP |
|---|---|---|---|---|---|
| GENERAL DATA | REGISTRATION NUMBER | R | | | R |
| | KEY DISPLAY NAME (LABEL) | | | | |
| | NAME | | | | |
| | FURIGANA | | | | |
| | CAPTION | | | | |
| | USE AS TRANSMITTER | | | | |
| | PROTECT CODE TYPE | | | | |
| | LINE TYPE | | | | |
| | EMAIL ADDRESS | DEPENDING ON CONFIGURATION | RW | RW | — |
| | FAX NUMBER | | | | |
| | ABROAD TRANSMISSION MODE | | | | |
| | TRANSMISSION SOURCE NAME SELECTION | | | | |
| | TRANSMISSION DESTINATION FIRST LINE INSERTION (ON/OFF) | | | | |
| | TRANSMISSION DESTINATION SECOND LINE INSERTION | | | | |
| | DOCUMENT FORM NUMBER | | | | |
| | NUMBER OF RELAY STATIONS | | | | |
| | RELAY STATION NUMBER | | | | |
| | FOLDER TYPE | | | | |
| | SERVER NAME | | | | |
| | PATH | | | | |
| | PORT NUMBER | | | | |
| | SMB/FTP USER NAME | | | | |
| | SMB/FTP PASSWORD | | | | |
| PERSONAL DATA | LOGIN PASSWORD | — | W | RW | — |
| | SMTP AUTHENTICATION USER NAME | — | RW | RW | — |
| | SMTP AUTHENTICATION PASSWORD | — | W | RW | — |
| | LDAP AUTHENTICATION USER NAME | — | RW | RW | — |
| | LDAP AUTHENTICATION PASSWORD | — | W | RW | — |
| | PROTECT CODE | — | W | W | W |
| | NEW DOCUMENT INITIAL ACL SETTING | — | RW | RW | RW |
| MANAGEMENT DATA | USER NAME (USER CODE) | — | RW | R | — |
| | AVAILABLE OPERATION INFORMATION | — | RW | R | — |

IMAGE FORMING APPARATUS AND ADDRESS INFORMATION PROCESSING METHOD

BACKGROUND OF THE INVENTION

1. Field of the Invention

The present invention relates to an image forming apparatus and an address information processing method. More particularly, the present invention relates to an image forming apparatus, which is embodied as a printer, a copier, a facsimile, a scanner and other image related devices, that can efficiently use address information for delivery of image data via a network without leaking of the address information. In addition, the present invention relates to an address information reference method for allowing a user to use such address information conveniently and securely.

2. Description of the Related Art

Conventionally, in a system where image forming apparatuses, such as a printer, a copier, a facsimile and a scanner, are connected to personal computers (PC) via a network, image data may be transmitted from an image forming apparatus storing the image data to another image forming apparatus to print an image based on the received image data. Also, image data may be transmitted from an image forming apparatus to PC to generate a file of the image data.

If such a conventional image forming apparatus transmits image data to a plurality of destinations having different output formats, the image forming apparatus requires a user to input and designate individual addresses of the destinations and respective output formats. Such a task is time-consuming and tedious for the user. In order to eliminate such a problem, for example, an address book having address information on registered destinations is conventionally prepared to an image forming apparatus, and a user of the image forming apparatus can designate one or more desired destinations with reference to the address book.

However, when a user registers address information in the address book by manipulating a display screen attached operation panel of the image forming apparatus, the user would find the registration task inefficient due to poor operability of the small display screen.

Japanese Laid-Open Patent Application No. 2001-312389 discloses an image forming apparatus that can store an address book including address information created and sent by a user through user's manipulation on PC connected thereto via a network.

The disclosed image forming apparatus is designed to exclusively execute an address book assisted operation in order to maintain data integrity against simultaneous reference and update of the address book by a plurality of users. Accordingly, for example, while PC occupies the image forming apparatus to transmit image data with reference to the address book, another PC has to wait for completion of the transmission job in order to use the address book. Also, there is a risk that data may be erroneously transmitted to an unexpected destination due to unnoticed changes of the address book.

Japanese Laid-Open Patent Application No. 2001-285562 discloses an image forming system having a plurality of Web servers operable independently of the image forming apparatus. The disclosed image forming system allows a plurality of Web client PCs to not only view an address book simultaneously but also create address information as a generic file. According to the disclosed invention, improved readability and writability save the necessity of user's manipulating the address book through a display screen of the image forming apparatus. In addition, it is possible to decrease conflict opportunities of viewing and other processes on the address book. Moreover, since the address book is exclusively written, it is possible to prevent a user from using the address book before the user knows content changes of the address book.

In the disclosed image forming system, however, while PC is updating the address book or executing a job to transmit image data with reference to the address book, the exclusive control does not allow another PC to change the address book. Accordingly, PC has to wait for completion of the updating of the address book or the data transmission job with reference to the address book. Since PC is allowed to access the address book after the completion, PC is forced to unnecessarily wait.

Also, users can refer to and change an address book without someone seeing via PC located away from an image forming apparatus. Thus, there is a risk of leaking address information in the address book that should not be disclosed for general public. Moreover, there is another serious risk that important information may be destroyed.

SUMMARY OF THE INVENTION

It is a general object of the present invention to provide an image forming apparatus and an address information processing method in which one or more of the above-mentioned problems are eliminated.

A more specific object of the present invention is to provide an image forming apparatus and an address information processing method that can ensure security of address information through user's limited use of the address information depending on registered authority types of the users.

Another more specific object of the present invention is to provide an image forming apparatus and an address information processing method in which even while a user is changing address information or transmitting image data by using the address information, a conflicting request from another user can be accepted to reduce wait time of the user.

In order to achieve the above-mentioned objects, there is provided according to one aspect of the present invention an image forming apparatus, including: an information storage part storing an address book on at least one user; a request receipt part receiving a process request for the address book together with user identification information from the user; and a request processing part, when the request receipt part receives the process request together with the user identification information from the user, authenticating the user based on the received user identification information and performing an operation corresponding to the process request on the address book in accordance with access authority permitted to the user, wherein the address book includes address information for transmitting data to the at least one user via a network and management information having user identification information of the at least one user.

In an embodiment of the present invention, the process request may be related to a view operation, a reference operation, an edit operation, and/or a delete operation on the address information and/or the management information.

In an embodiment of the present invention, the access authority to address information and/or management information may include a view authority, a reference authority, an edit authority and a delete authority for the address information and/or the management information.

In an embodiment of the present invention, the access authority table may be configured to partition the at least one user into a plurality of user groups having different access authority to the address information and/or the management information. In an embodiment of the present invention, the process request may be related to a backup operation and/or a restore operation for the address information and/or the management information, and the access authority may include backup authority and/or restore authority for the address information and/or the management information.

In an embodiment of the present invention, the request processing part, when the request receipt part receives a process request related to the edit operation on the address information from a user during execution of an operation corresponding to another process request, may queue the received process request.

In an embodiment of the present invention, the request control part, when a plurality of process requests related to the edit operation on the same address information are queued, may merge the plurality of process requests.

Additionally, there is provided according to another aspect of the present invention a method of processing an address book for an image forming apparatus, including steps of: receiving a process request for an address book together with user identification information from a user; and authenticating the user based on the user identification information supplied from the user; and performing an operation corresponding to the process request on the address book in accordance with an access authority permitted to the user, wherein the address book includes address information for transmitting data to the at least one user via a network and management information having user identification information of the at least one user.

According to one aspect of the present invention, since access authority of users to an address book can be set in detail, it is possible to ensure security of accesses to the address book. In addition, even during execution of an operation corresponding to a process request, such as a change request of an address book from a client and a transmission request of image data with reference to the address book, the image forming apparatus can accept another process request related to an edit operation via another client or an operation panel. As a result, it is possible to accept the process request with less wait time.

Other objects, features and advantages of the present invention will become more apparent from the following detailed description when read in conjunction with the accompanying drawings.

BRIEF DESCRIPTION OF THE DRAWINGS

FIG. 3 shows an exemplary access authority table in association with address book operations according to the first embodiment;

DETAILED DESCRIPTION OF THE PREFERRED EMBODIMENTS

Figure 1:
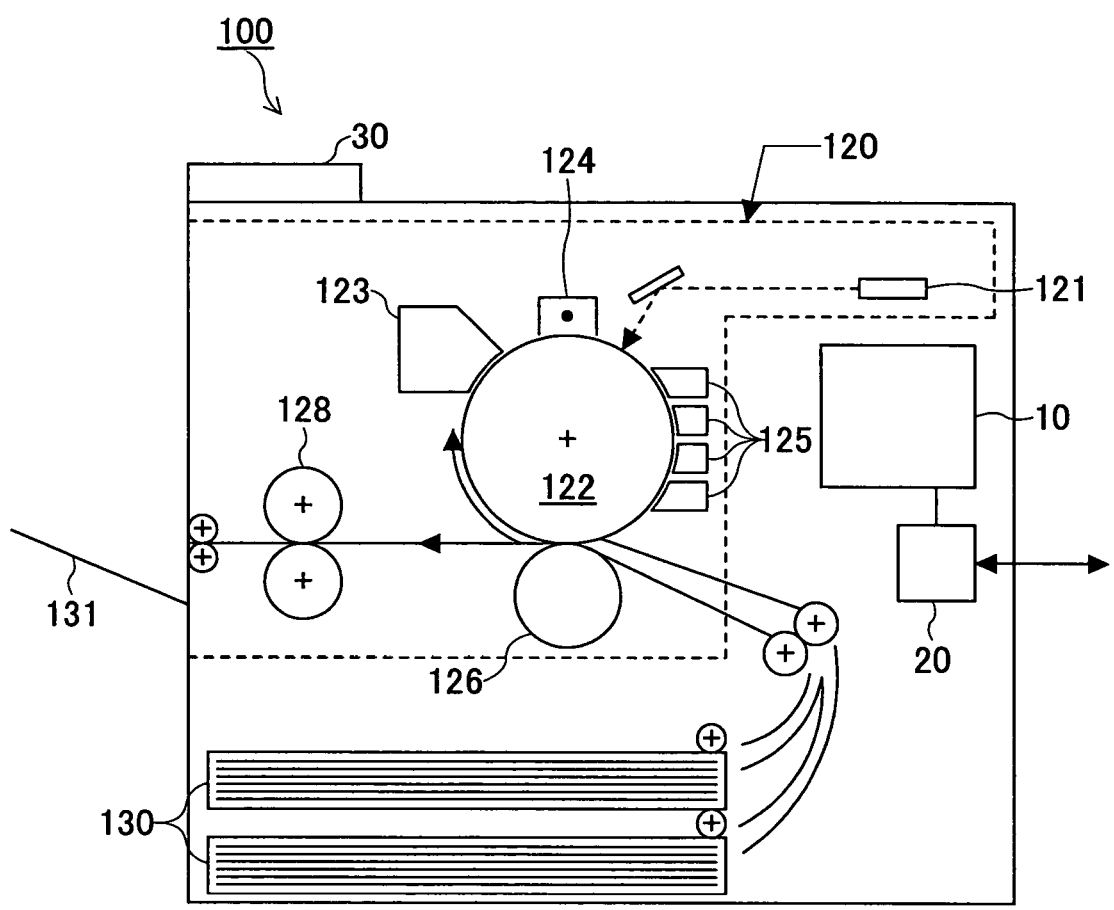
FIG. 1 shows an exemplary structure of an image forming apparatus according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 shows an exemplary structure of an image forming apparatus according to a first embodiment of the present invention.

Referring to FIG. 1, an image forming apparatus 100 includes an image formation part 120, a recording medium supply part 130, an image processing part 10, an interface 20 and an operation panel 30. The image formation part 120 forms a toner image on a recording medium. The recording medium supply part 130 accommodates recording media, which may be embodied as papers, and supplies each recording medium to the image formation part 120. The image processing part 10 has functions of processing image data and transmitting image data to a designated destination registered in possessed address information. The interface 20 is used as an interface to a network connected to the image forming apparatus 100. The operation panel 30, which includes a liquid crystal display for displaying information on the image forming apparatus 100, is used for a user to input an instruction.

The image formation part 120 includes a photoconductor drum 122, an electrifying charger 124, a laser write part 121, a development part 125, a transfer drum 126, a cleaning part 123, a fixing part 128 and an output paper tray 131. The photoconductor drum 122 forms an electrostatic latent image. The electrifying charger 124 uniformly electrifies the photoconductor drum 122. The laser write part 121 writes a latent image by radiating laser light on the photoconductor drum 122. The development part 125 forms a toner image by attaching toners on the formed electrostatic latent image on the photoconductor drum 122. The transfer drum 126 transfers the toner image on the photoconductor drum 122 on a recording medium, which is embodied as a paper. The cleaning part 123 removes remaining toners on the circumferential surface of the photoconductor drum 122. The fixing part 128 fixes the toner image transferred onto the recording medium. The fixed recording medium is supplied to the output paper tray 131.

Specifically, the image processing part 10 can conduct various types of image processes, such as gradation correction and color conversion, on image data that are supplied from an external device via the interface 20 or are formed in the image forming apparatus 100, and then delivers the resulting image data to the image formation part 120. Also, the image processing part 10, in response to receipt of a reference request for address information that is used for transmission of image data from PC via the interface 20 or the operation panel 30, transmits the requested image data to another image forming apparatus or PC via the interface 20 in accordance with the received reference request.

When the image forming apparatus 100 performs image formation, the image processing part 10 is used to conduct an image process on image data, for example, supplied from PC via the interface 20.

The electrifying charger 124 electrifies the photoconductor drum 122. The laser write part 121 forms an electrostatic latent image by radiating laser light modulated corresponding to the processed image data on the electrified photoconductor drum 122. The development part 125 develops the formed electrostatic latent image by using toners, and forms a toner image on the photoconductor drum 122. The recording medium supply part 130 supplies each recording medium to a nip part between the transfer drum 126 and the photoconductor drum 122. The transfer drum 126 transfers the toner image on the photoconductor drum 122 onto the recording medium while passing through the nip part.

In order to fix the toner image on the recording medium, heat and pressure are applied to the toner image transferred recording medium during passage through the fixing part 128. Then, the fixed recording medium is fed out to the output paper tray 131.

Simultaneously, after the transferring of the toner image onto the recording medium, remaining toners are removed from the circumferential surface of the photoconductor drum 122 by the cleaning part 123, and the cleaned up photoconductor drum 122 is electrified by the electrifying charger 124 again so as to get ready to form the next image. After that, the above-mentioned toner image formation cycle is repeated.

Although the above image forming apparatus has been described as a direct transferring type of image forming apparatus having a single photoconductor drum, the present invention is not limited to this embodiment. The present invention is also applicable to another type of image forming apparatus, for example, a tandem. intermediate transferring type of image forming apparatus using an intermediate transfer body. In addition, the present invention may be embodied as a multifunctional product having a plurality of functions such as a scanner function and a facsimile function.

Figure 2:
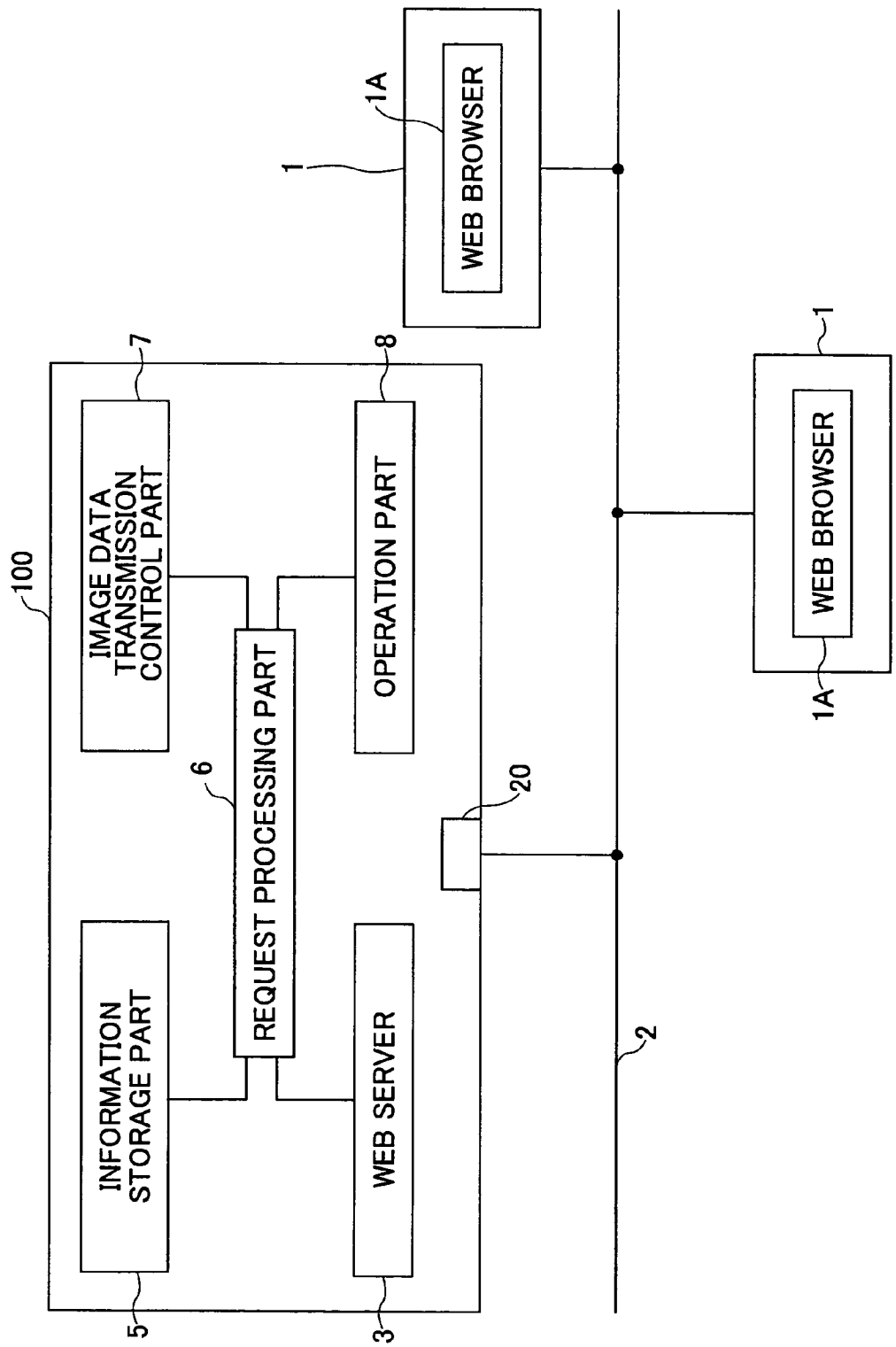
FIG. 2 is a block diagram illustrating an exemplary structure of an image forming system related to address book process requests according to the first embodiment.

FIG. 2 is a block diagram illustrating an exemplary structure of an image forming system related to address book process requests according to the first embodiment.

Referring to FIG. 2, the image forming apparatus 100 is connected to a network 2 via the interface 20. Also, PCs 1, which serve as a Web client to issue process requests on an address book of the image forming apparatus 100, are connected to the network 2.

For convenience of explanation, two PCs 1 having browsers 1A are illustrated as Web clients in FIG. 2. However, the present invention is not limited to the configuration. One or more than two PCs 1 may be connected to the network 2 as Web clients. Also, the network 2 may be embodied as LAN (Local Area Network), WAN (Wide Area Network) connected to a public network, and/or the Internet.

The image processing part 10 of the image forming apparatus 100 includes an information storage part 5, a Web server 3, a request processing part 6, an image data transmission control part 7 and an operation part 8. The information storage part 5 stores at least one address book mainly configured from address information and management information. The address information includes any number of address information items, such as e-mail addresses, FAX numbers and URLs (Uniform Resource Locators), for transmission of image data via the network 2. The management information includes any number of user identification information items, such as ID numbers and passwords. The Web server 3, which is connected to the network 2 via the interface 20, displays a Web page on PC 1 and receives process request for the address book stored in the information storage part 5. The request processing part 6 determines whether the requesting user should be authorized, and if the user has access authority to the address book, the request processing part 6 extracts the address information and others from the information storage part 5 corresponding to the access authority granted to the user. The image data transmission part 7 controls transmission of image data to destinations that the user desires in accordance with instructions of the request processing part 6. When a user supplies an instruction via the operation panel 30 rather than via PC 1, the operation part 8 can display predefined information corresponding to the instruction on a liquid crystal display.

Specifically, the request processing part 6 determines authorization of the requesting user based on comparison between user identification information stored in the information storage part 6 and user identification information supplied from the user via PC 1 or the operation panel 30. Based on the matching user identification information, the request processing part 6 classifies the user into a group having predefined access authority, and checks contents of the access authority granted to the user with reference to an access authority table, which will be described in detail below. The request processing part 6 extracts address information and/or management information corresponding to the process request of the address book from the information storage part 5 based on the determined access authority, and displays the extracted information items on a display screen of PC 1 via the Web server 3 or on the liquid crystal display screen via the operation part 8. In addition, when receiving a backup request for the address book via the operation panel 30 or PC 1, the request processing part 6 determines whether the requesting user is authorized to instruct the backup operation on the address book. Then, for example, if it is determined that the user is an administrator based on user identification information supplied from the user, the request processing part 6 stores the address book and/or other information to be backed up into a destination, such as PC 1 designated by the administrator, another information storage means connected via the network 2 and/or another information storage means of the image forming apparatus 100. If the address book is backed up in another information storage means in this manner, it is possible to easily recover original address information from the backed up address book at time of accidental destruction and malfunction of the address book.

FIG. 3 shows an exemplary access authority table in association with address book operations according to the first embodiment.

Referring to FIG. 3, an access authority table 60 is mainly configured from three data categories (rows) and four user categories (column). The data categories include "general data" 65, "personal data" 66 and "management data" 67, each of which further includes a number of information items as illustrated in the access authority table 60. On the other hand, the user categories include "ordinary user" 61, "user administrator" 62, "owner" 63 and "owner group" 64, and access authority to individual data categories and information items is set in detail for each user category, as illustrated in FIG. 3.

In this embodiment, access authority is classified into three types of operations on an address book: "read (view and refer): R", "edit (change): W" and "delete" (not illustrated herein)". The present invention is not limited to these operations. As described later, the operations on the address book may include other types of operations such as a backup operation and a restore operation.

The data category "general data" 65 represents one or more property information items on a destination user, such as "registration number" and "name", and one or more address information items on the destination user, such as "email address" and "FAX number". In the illustrated access authority table, for example, all user categories are allowed to read the property information items. On the other hand, the ordinary user 61 may be allowed to read and/or edit the address information items depending on predefined configuration. The user administrator 62 is allowed to read and edit all the address information items. The owner 63 is allowed to read and edit all the address information items on only a portion of the address book owned by the owner 63 rather than the whole address book. The owner group 64 is not allowed to read and edit the address information items, which is represented by the sign "-" in the access authority table 60.

The data category "personal data" 66 represents one or more address information items related to access authentication on the destination user, such as "login password", "SMTP (Simple Mail Transfer Protocol) authentication user name", "SMTP authentication password", "LDAP (Light Weight Directory Access Protocol) authorization user name", and "LDAP authentication password".

The data category "management data" 67 is mainly prepared for administrators of the image forming apparatus 100, such as "user name" and "available operation information", which relates to types of available operations to the destination user.

As mentioned above, users are also classified into the four user categories. The user category "ordinary user" 61 are allowed to read property information items on the destination user, such as "registration number" and "name". Also, the ordinary user 61 is allowed to read (view and refer to) the address information items, such as "email address" and "FAX number", depending on predefined configurations. In general, although depending on the configurations, the ordinary user 61 is not allowed to read and edit "personal data" 66 and "management data" 67.

The user category "user administrator" 62 represents users that can provide a new entry and set access authority for users. In this embodiment, the user administrator 62 is provided with all types of access authority, such as "read", "edit" and "delete", on "general data" 65 and "management data" 67. Also, the present invention has one feature in that access authority on some address information items of "personal data" 66 can be partially limited. Thereby, if a user has a certain information item that the user does not want the user administrator to read, the user can hide the information item from the user administrator.

The user category "owner" 63 represents an owner (destination) user of address information. In the illustrated access authority table, the owner 63 is allowed to have all types of access authority: "read", "edit" and "delete" on a portion of "general data" 65 and "personal data" 66 on the user and read "management data" 67 on the user.

The user category "owner group" 64 represents users, each of which is a substitute of the corresponding owner. In the illustrated access authority table, each user of "owner group" 64 is allowed to read property information items, such as "registration number" and "name", on an owner user.

Figure 4:
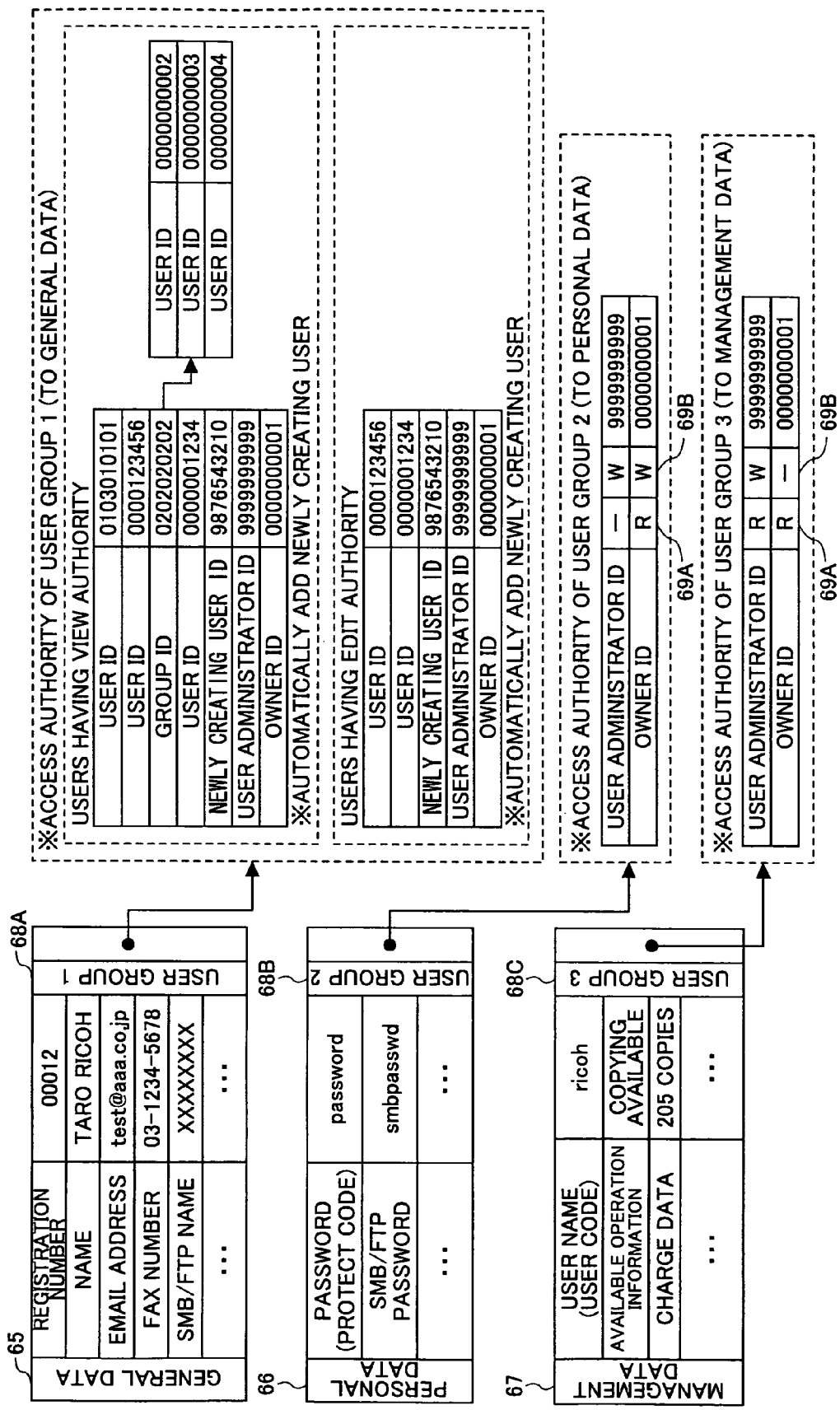
FIG. 4 is a schematic diagram illustrating an exemplary data structure of an address book according to the first embodiment.

FIG. 4 is a schematic diagram illustrating an exemplary data structure of an address book according to the first embodiment.

Referring to FIG. 4, an address book is configured to have several link-connected tables. Specifically, each of the data categories "general data" 65, "personal data" 66 and "management data" 67 are linked to "user group 1" 68A, "user group 2" 68B and "user group 3" 68C, respectively.

As shown in FIG. 4, each user group has information on group members and one or more types of access authority to an address book granted to the respective group members. When the image forming apparatus 100 receives a process request from a user, the request processing part 6 determines which user group 68 the user belongs to based on user identification information, for example, user's ID, supplied from the user. Based upon the determined user group, the request processing part 6 identifies what type of access authority to each data category is granted to the user. By comparing contents of the process request to the permitted access authority to the individual data categories 65 through 67, the request processing part 6 can properly extract and offer listed address information items and/or management information items in accordance with the access authority granted to the user.

For example, if a user having ID number "0000123456" requests a process on an address book of the image forming apparatus 100, it can be observed from the illustrated tables that the user belongs to "user group 1" 68A and has two types of access authority: "read: R" 69A and "edit: W" 69B to the data category "general data" 65. Accordingly, if the user issues the process request related to modification of "general data" 65, the process request is accepted. In this case, contents of the general data 65 are displayed as "registration number: 00012; name: Taro Ricoh; e-mail address: test@qqq.co.jp; FAX number: 03-1234-5678; . . . ".

Alternatively, if a user having ID number "0000000001" requests a process on the address book of the image forming apparatus 100, it can be observed from the illustrated tables that the user is the owner of the address information. In this case, the owner user belongs to "user group 1" 68A, "user group 2" 68B and "user group 3" 68C and has all types of access authority: "read: R" 69A and "edit: W" 69B to every data category: "general data" 65, "personal data" 66 and "management data" 67 except for "edit: W" to "management data" 67. Accordingly, if the process request from the user is related to modification of "management data" 67, the process request is rejected, and on the other hand, if the process request is related to viewing and reference of management data 67, the process request is accepted, and then contents of "management data" 67 are displayed as "user name: ricoh; available operation information: copying available; charge data: 00205 copies; . . . ".

Figure 5:
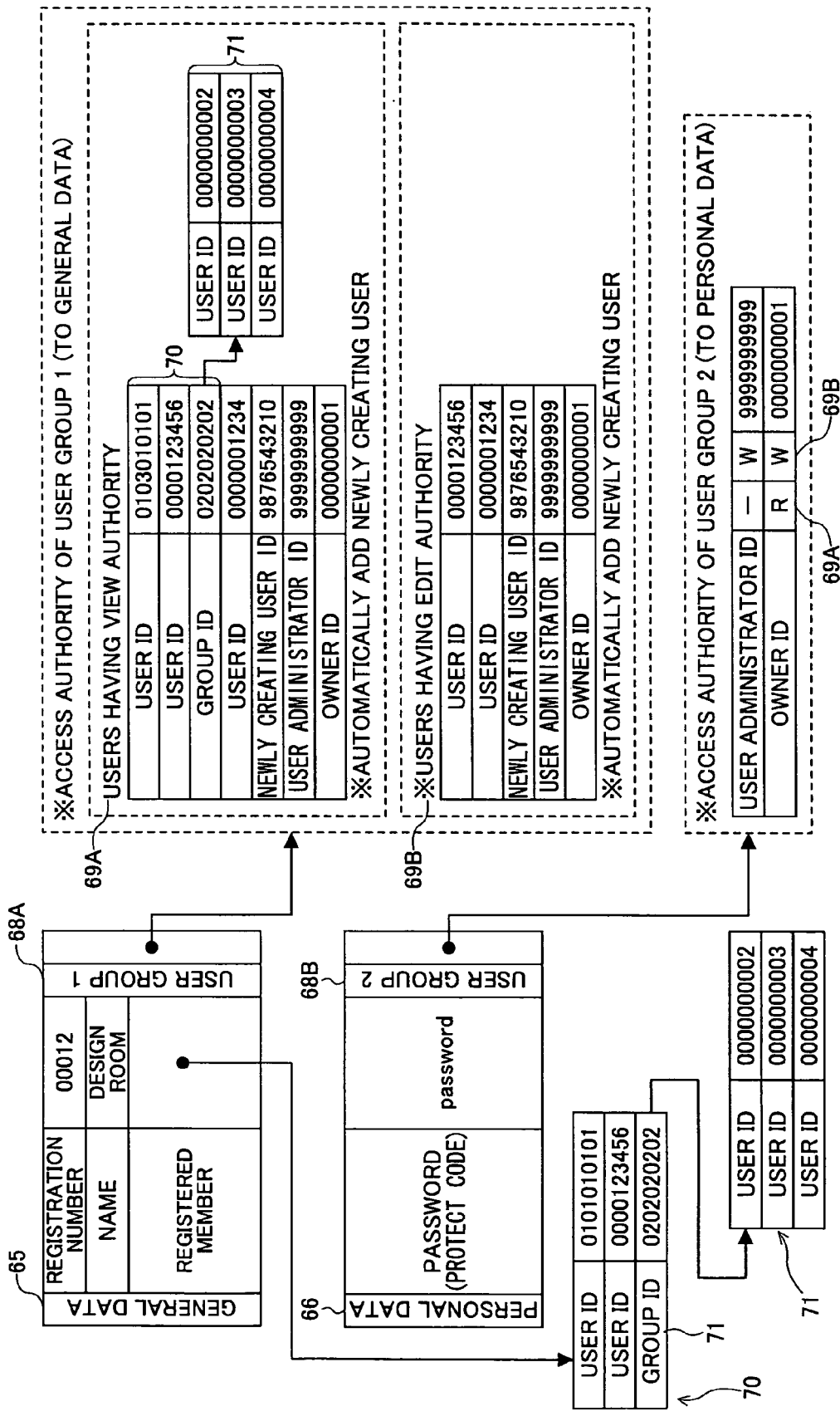
FIG. 5 is a schematic diagram illustrating another exemplary data structure of an address book according to the first embodiment.

FIG. 5 is a schematic diagram illustrating another exemplary data structure of an address book according to the first embodiment.

Referring to FIG. 5, in this embodiment, "general data" 65 may have a new address information item "registered member". The address information item "registered member" includes not only individual users but also a group of users as members thereof.

For example, "general data" 65 having the registration number "00012" and "name: design room" may include users having user IDs "0101010101" and "000123456" and a user group 71 having group ID "0202020202", which is composed of user IDs "0000000002", "0000000003" and "0000000004", as an address information item "registered member" 70.

As mentioned above, the user groups 1 through 3 are set for types of access authority. Accordingly, as described with respect to FIG. 4, when a process request is received from a user, the request processing part 6 performs the requested operation on the address book in accordance with access authority granted to the user.

Figure 6:
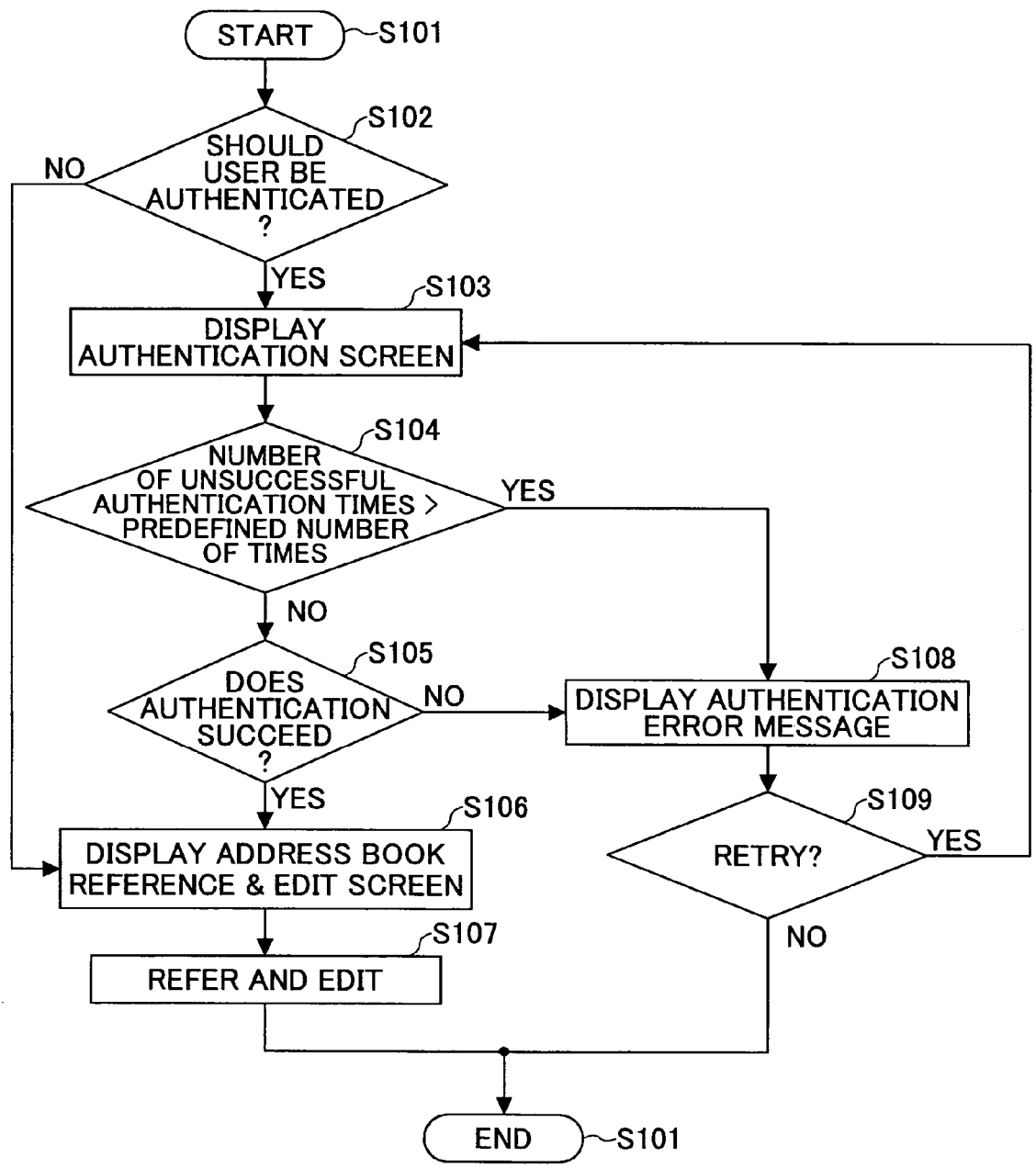
FIG. 6 is a flowchart of an exemplary authentication procedure of authenticating a user for an address book process request according to the first embodiment.

FIG. 6 is a flowchart of an exemplary authentication procedure of authenticating a user for an address book process request according to the first embodiment.

Referring to FIG. 6, when a user issues a process request for an address book of the image forming apparatus 100 via the Web server 3 or the operation part 3 from PC 1 or the operation panel 30, the authentication procedure starts at step S101. At step S102, the Web server 3 determines whether to authorize the requesting user. If the authorization has to be made, a login screen for prompting the user to input, for example, ID number and password of the user is displayed on PC 1 or the operation panel 30 at step S103.

At step S104, the request processing part 6 checks whether the number of unsuccessful authentication times is greater than a predefined number of times. If the number of unsuccessful authentication times is not greater than the predefined number of times (S104: NO), the control moves to step S105.

At step S105, the request processing part 6 checks whether the ID number and the password supplied from the user match those registered in advance. Based upon the comparison, if the user is successfully authenticated (S105: YES), the request processing part 6 obtains the requested address book, and displays a reference & edit screen of the address book on PC 1 or the operation panel 30 at step S106. A step S107, the user can refer to and edit the address book with reference to the displayed reference & edit screen. In this manner, the user can edit an information item of the address book with reference to the displayed reference & edit screen or transmit a desired image to a destination user that the user can refer to.

On the other hand, if the number of unsuccessful authentication times is greater than the predefined number of times (S104: YES) or the user is not successfully authenticated (S105: NO), an authentication error message is displayed on PC 1 or the operation panel 30 at step S108. Then, if the user attempts to issue the address book process request (S109: YES), the login screen for prompting the user to input ID number and password is displayed again at step S103.

Figure 7:
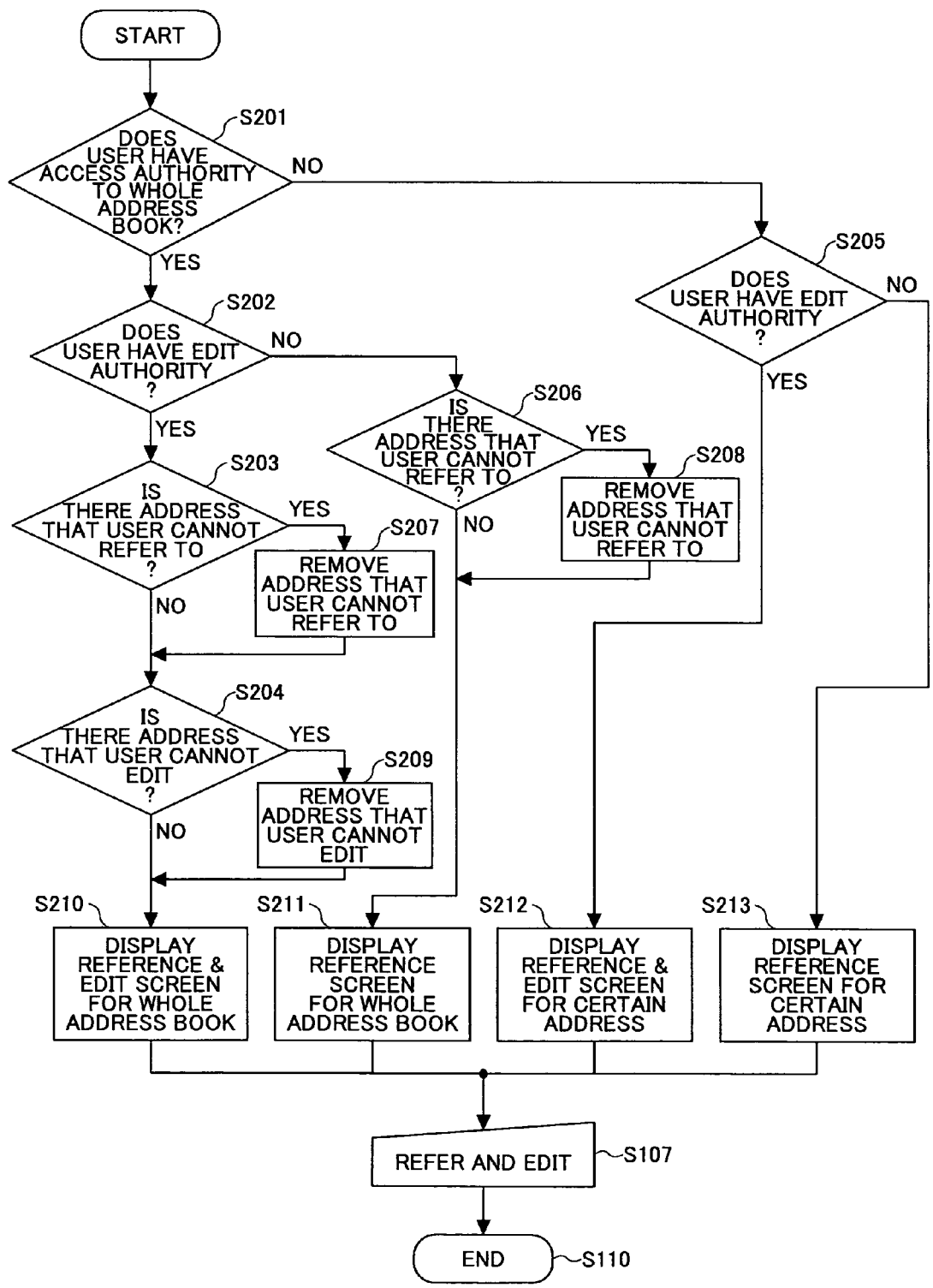
FIG. 7 is a flowchart of an exemplary authentication procedure of authenticating a user for an address book reference and edit request according to the first embodiment.

FIG. 7 is a flowchart of an exemplary authentication procedure of authenticating a user for an address book reference and edit request according to the first embodiment.

Referring to FIG. 7, when the image forming apparatus 100 receives a reference request for an address book from a user via PC 1 or the operation panel 30, the request processing part determines whether the user is allowed to read the address book of all users stored in the information storage part 5 based on ID number and password supplied from the user at step S201.

Then, if the user is allowed to read the whole address book (S201: YES), the request processing part 6 further determines whether the user is allowed to edit the whole address book at step S202. If the user is allowed to edit the whole address book, that is, if the user is a user administrator (S202: YES), the request process part 6 further determines whether there is a certain address that the user cannot refer to at step S203. On the other hand, if there is no address that the user cannot refer to (S203: NO), the request processing part 6 further determines whether there is a certain address that the user cannot edit at step S204. If there is no address that the user cannot edit (S204: NO), a reference & edit screen for referring to and editing the whole address book is displayed on PC 1 or the operation panel 30 so that the user can refer to and edit the address book of all users at step S210.

On the other hand, if there is a certain address that the user cannot refer to (S203: YES), the certain address is removed at step S207. Also, if there is a certain address that the user cannot edit (S204: YES), the reference & edit screen for the whole address book is displayed in a condition where the certain address cannot be edited at step S210.

In this manner, even if a requesting user is a user administrator, an address book can be configured so that even the user administrator is not allowed to read and/or edit a certain address. Thus, it is possible to properly protect such an address that an owner of the address would not like not only ordinary users but also user administrators to read and/or edit.

On the other hand, if the requesting user is not allowed to edit the whole address book (S202: NO), the request processing part 6 further determines whether there is a certain address that the user cannot refer to at step S206. If there is no address that the user cannot refer to (S206: NO), the reference & edit screen for the whole address book is displayed in a condition where no address can be edited at step S211. On the other hand, it there is a certain address that the user cannot refer to (S206: YES), the certain address is removed at step S208. At step S211, the reference & edit screen for the partial address book is displayed in a condition where no address can be edited.

On the other hand, if the requesting user is not allowed to refer to the whole address book based on the ID number and the password supplied from the user, that is, for example, if the user is an ordinary user (S201: NO), the request processing part 6 further determines whether the user is allowed to edit a certain address requested by the user at step S205. If the user is allowed to edit the certain address (S205: YES), a reference & edit screen for the certain address is displayed in a condition where the certain address information item can be edited at step S212. On the other hand, if the user is not allowed to edit the certain address (S205: NO), the reference & edit screen is displayed in a condition where the certain address cannot be edited at step S213. In this condition, the user is allowed to only view and refer to the certain address.

In this manner, a user can read and/or edit all or a portion of an address book under an appropriately secured condition.

Figure 8:
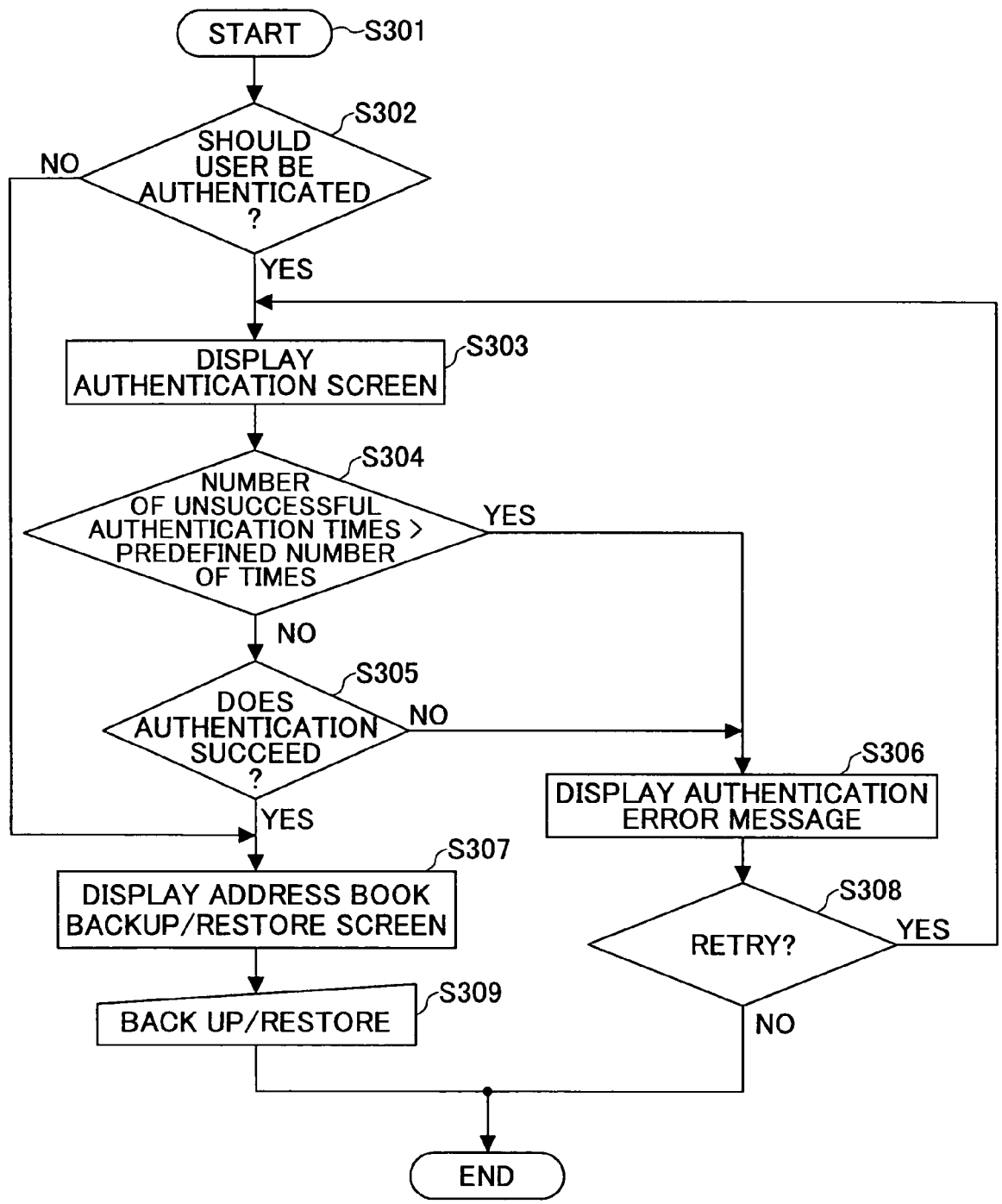
FIG. 8 is a flowchart of an exemplary authentication procedure of authenticating a user for an address book backup and restore request according to the first embodiment.

FIG. 8 is a flowchart of an exemplary authentication procedure of authenticating a user for address book backup and restore requests according to the first embodiment.

Referring to FIG. 8, when a user issues an address book backup request or an address book restore request from PC 1 or the operation panel 30 to the image forming apparatus 100 via the Web server 3 or the operation part 8, the authentication procedure starts at step S301. At step S302, the request processing part 6 determines whether the user should be authenticated. If the user has to be authenticated (S302: YES), an authentication screen is displayed at step S303.

At step S304, the request processing part 6 further determines whether the number of unsuccessful authentication times is greater than a predefined number of times.

If the number of unsuccessful authentication times is not greater than the predefined number of times (S304: NO), the request processing part 6 further determines whether the user has authority of backing up/restoring the address book, for example, based on ID number and password supplied in the displayed screen from the user. If the user has the authority of backing up the address book (S305: YES), a backup & restore screen is displayed at step S307. At step S309, the backup/restore operation is executed and the backup/restore procedure is completed.

On the other hand, it the number of unsuccessful authentication times is greater than the predefined number of times (S304: YES) or the user is not successfully authenticated (S305: NO), an authentication error screen is displayed at step S306, and the user is prompted to retry authentication at step S308. If the user attempts to be authenticated (S308: YES), the authentication screen is displayed again to prompt the user to input the ID number and password of the user. On the other hand, if the user does not attempt to be authenticated (S308: NO), the backup/restore procedure is cancelled.

It is noted that the request processing part 6 may have functions of encrypting backup data and decrypting restore data.

Figure 9:
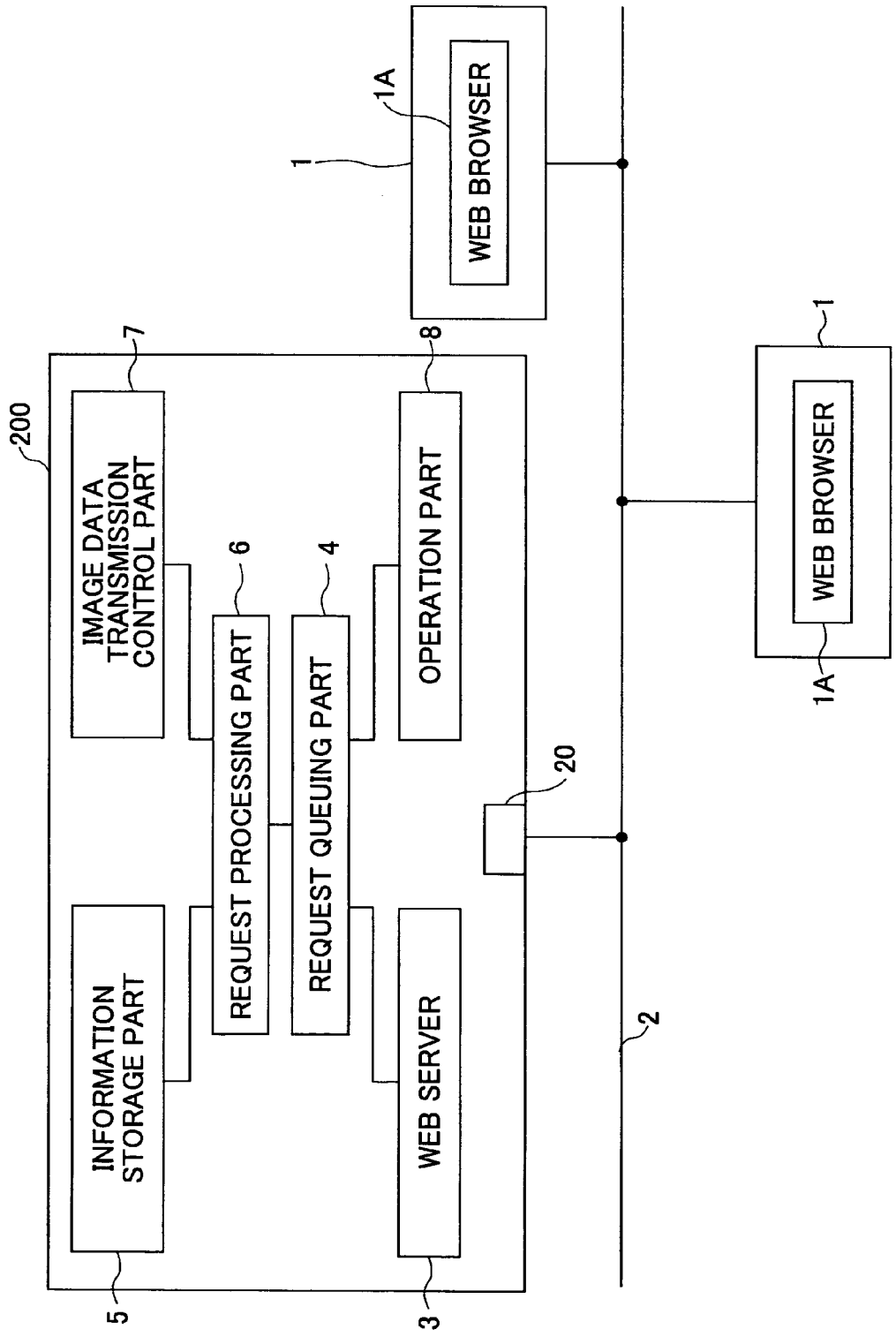
FIG. 9 is a block diagram illustrating an exemplary structure of an image forming system related to address book process requests according to a second embodiment of the present invention.
Figure 10:
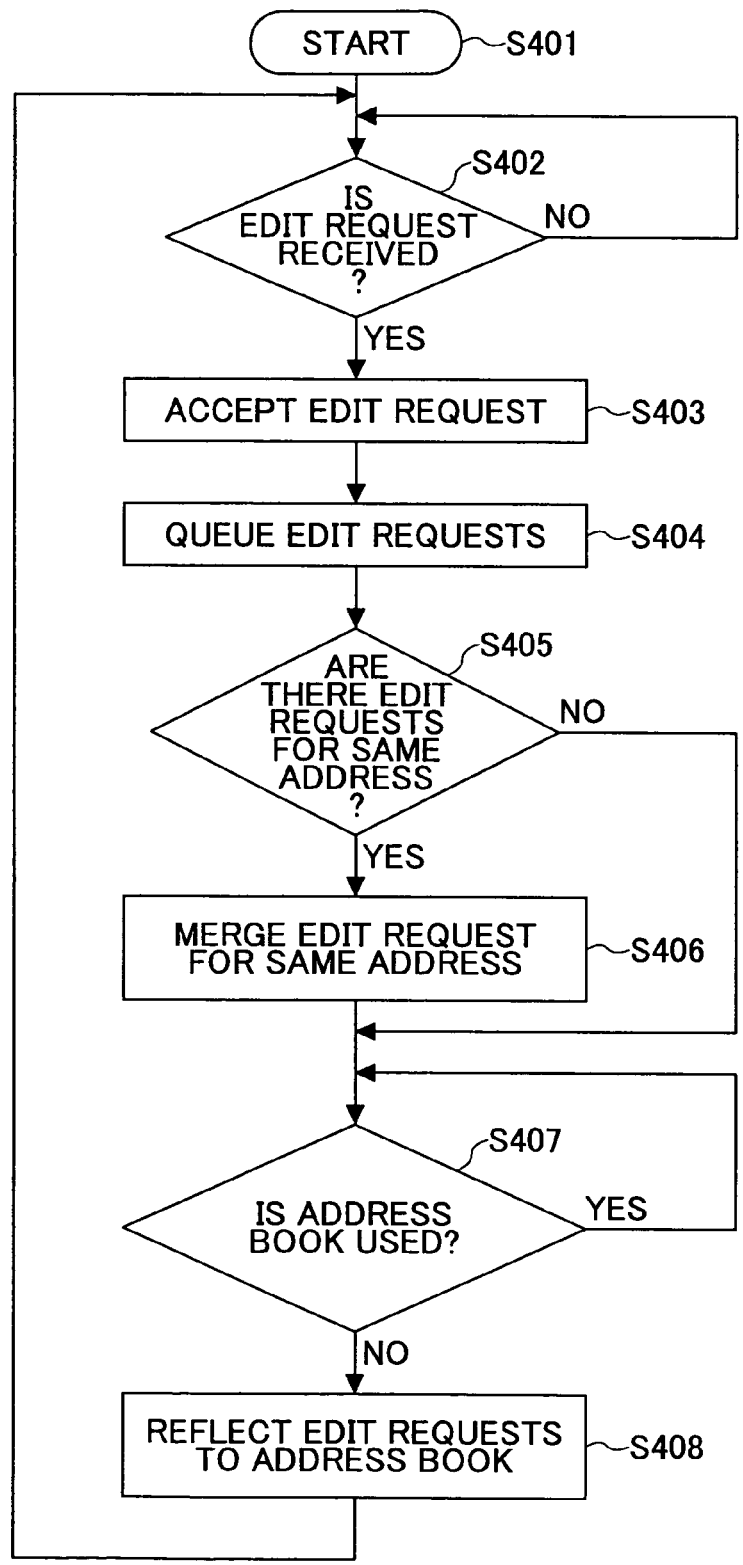
FIG. 10 is a flowchart of an exemplary queuing and merging procedure of queuing and merging a plurality of edit requests according to the second embodiment.

A description is given, with reference to FIG. 9 and FIG. 10, of an image forming apparatus according to a second embodiment of the present invention. In the second embodiment, the image forming apparatus differs from the above-mentioned image forming apparatus according to the first embodiment in that the image forming apparatus according to the second embodiment further includes a request queuing part 4 to accept and queue conflicting process requests. In this embodiment, the same components as those of the first embodiment are designated by the same reference numerals, and the request queuing part 4 is intensively described.

FIG. 9 is a block diagram illustrating an exemplary structure of an image forming system related to address book process requests according to the second embodiment.

Referring to FIG. 9, an image forming system includes an image forming apparatus 200 and two PCs 1. The image forming apparatus 200 is connected to the PCs 1 having Web browsers 1A via a network 2.

For convenience of explanation, the two PCs 1 are illustrated in FIG. 9. However, the present invention is not limited to this embodiment, and another image forming system may include one or more than two PCs 1. Also, the network 2 may be embodied as LAN, WAN or the Internet.

The image forming apparatus 200 includes an image processing part 20 having a Web server 3, a request processing part 6, an information storage part 5, a request queuing part 4, an image data transmission part 7 and an operation part 8. The image forming apparatus 200 is connected to the network 2 via an interface 20.

In response to receipt of address book process requests conflicting with each other from users, the request queuing part 4 accepts the conflicting process requests and queues the process requests during execution of other process requests conflicting with the queued process request.

Specifically, during execution of an operation corresponding to a process request supplied from a user via the Web server 3 or the operation part 8, when the image forming apparatus 200 receives another process request conflicting with the currently executed process request, for example, a process request involved in modification of an address book referred to by the currently executed process request, the request queuing part 4 accepts and queues the conflicting process request until completion of the currently executed process request. If the image forming apparatus 200 receives a plurality of conflicting process requests involved in reference and/or change of the same address, the request queuing part 4 adjusts and merges these process requests for the same address.

In this operation, a user does not have to wait acceptance of a process request during execution of a currently executed process request conflicting with user's process request. In addition, since the request processing part 6 can collectively execute operations on the merged process requests for the same address, it is possible to shorten processing time of the image forming apparatus 200.

FIG. 10 is a flowchart of an exemplary queuing and merging procedure of queuing and merging a plurality of edit requests according to the second embodiment.

Referring to FIG. 10, during execution of a process request (S401), the request queuing part 4 determines whether one or more edit requests for an address book have been received from a user via the Web server 3 or the operation part 8 at step S402. If one or more edit requests are received (S402: YES), the request queuing part 4 accepts these edit requests at step S403.

At step S404, the request queuing part 4 queues the accepted edit requests. At step S405, the request queuing part 4 determines whether the queued edit requests include a plurality of edit requests for the same destination at step S405. If a plurality of queued edit requests are involved in the same destination (S405: YES), the request queuing part 4 merges these edit requests at step S406.

At step S407, the request queuing part 4 checks whether the address book of the same destination is being currently used for other process requests such as an address book edit operation and an image data transmission operation.

If the address book is not being currently used (S407: NO), the request processing part 6 edits the address book in accordance with the merged edit requests sequentially from the first process request of the queued edit requests at step S408.

According to the second embodiment, when a user attempts to edit an address book, the user does not have to wait for acceptance of the edit request without dependency on current statuses of the address book. Also, the address book is not changed until a job involved in the address book is completed. As a result, the request processing part 6 can properly execute an operation corresponding to a preceding job without influence of the edit request. In addition, since the request queuing part 4 merges a plurality of edit requests for the same address during queuing operation, it is possible to shorten total processing time of individual edit processes.

The present invention is not limited to the specifically disclosed embodiments, and variations and modifications may be made without departing from the scope of the present invention.

The present application is based on Japanese Patent Priority Applications No. 2003-123427 filed Apr. 28, 2003, No. 2003-304983 filed Aug. 28, 2003, and NO. 2004-122016 filed Apr. 16, 2004, the entire contents of which are hereby incorporated by reference.

What is claimed is:

1. An image forming apparatus, comprising:
an information storage unit configured to store an address book of at least one user;
a request receipt unit configured to receive a process request for the address book and user identification information from the at least one user;
a request processing unit configured to authenticate the at least one user based on the received user identification information and perform an operation corresponding to the process request on the address book in accordance with access authority granted to the at least one user, when the request receipt unit receives the process request and the user identification information from the at least one user; and
a request control unit configured to queue the received process request, when the received process request corresponds to an edit operation on the address book and is received during execution of an operation corresponding to another process request on the address book, and to merge a plurality of process requests for multiple users when the plurality of process requests are related to the edit operation on a same address information and are queued, wherein
the address book has both address information for transmitting data to the at least one user via a network and management information having user identification information of the at least one user, and the another process request corresponds to at least one of a view operation, a reference operation, an edit operation, and a delete operation on information stored in the address book.

2. The image forming apparatus as claimed in claim 1, wherein the access authority comprises view authority, reference authority, edit authority and delete authority for at least one of the address information and the management information of the address book.

3. The image forming apparatus as claimed in claim 1, wherein the request receipt unit comprises a Web server for providing a Web page for allowing the at least one user to view and/or input information.

4. The image forming apparatus as claimed in claim 1, wherein the request receipt unit includes an operation unit for allowing the at least one user to view and/or input information.

5. The image forming apparatus as claimed in claim 1, wherein the user identification information of the management information comprises an ID number and a password of the at least one user.

6. The image forming apparatus as claimed in claim 5, wherein the management information further comprises available operation information and charge information for the at least one user.

7. The image forming apparatus as claimed in claim 1, wherein the address information comprises at least one of an email address, a FAX number and a URL of the at least one user.

8. The image forming apparatus as claimed in claim 1, wherein the information storage unit has an access authority table indicating access authority to a data category of the address information and the management information for a user category of the at least one user, and the request processing unit authenticates the at least one user for the process request based on the access authority table.

9. The image forming apparatus as claimed in claim 8, wherein the access authority table is configured to have a plurality of user groups having different access authority to at least one of the address information and the management information.

10. The image forming apparatus as claimed in claim 1, wherein the process request corresponds to at least one of a backup operation and a restore operation for at least one of the address information and the management information, and the access authority comprises at least one of backup authority and restore authority for at least one of the address information and the management information.

11. The image forming apparatus as claimed in claim 10, wherein the at least one of the address information and the management information is encrypted, and the at least one of the encrypted address information and the encrypted management information is backed up or restored.

12. The image forming apparatus as claimed in claim 1, wherein the request processing unit displays an error message to the at least one user when the at least one user is unsuccessfully authenticated for the process request.

13. The image forming apparatus as claimed in claim 1, wherein the request control unit is further configured to integrate multiple modification operations for a same destination during the period between overlapping process requests.

14. A method of processing an address book for an image forming apparatus, comprising:
receiving a process request for an address book and user identification information from at least one user;
authenticating the at least one user based on the user identification information supplied from the at least one user;
performing an operation corresponding to the received process request on the address book in accordance with access authority granted to the at least one user; and
queuing the received process request, when a process request related to an edit operation on the address book from the at least one user is received during execution of an operation corresponding to another process request on the address book, the queuing including merging the plurality of process requests from multiple users when a plurality of process requests are related to the edit operation on a same address information and are queued, wherein
the address book has both address information for transmitting data to the at least one user via a network and management information having user identification information of the at least one user, and
the another process request corresponds to at least one of a view operation, a reference operation, an edit operation, and a delete operation on information stored in the address book.

15. The method as claimed in claim 14, wherein the access authority comprises view authority, reference authority, edit authority and delete authority for at least one of the address information and the management information of the address book.

16. The method as claimed in claim 14, wherein the process request and the user identification information are received via a Web server or an operation unit of the image forming apparatus.

17. The method as claimed in claim 14, wherein the authenticating is performed based on an access authority table indicative of access authority to each data category of the address information and the management information for each one of a user category of the at least one user, and the operation corresponding to the process request is performed with accordance with access authority granted to the at least one user with reference to the access authority table.

18. The method as claimed in claim 14, wherein the process request corresponds to at least one of a backup operation and a restore operation for at least one of the address information and the management information, and the access authority comprises at least one of backup authority and restore authority for at least one of the address information and the management information.

19. The method as claimed in claim 14, further comprising:
displaying an error message to the at least one user, when the at least one user is unsuccessfully authenticated for the process request.

20. The image forming apparatus as claimed in claim 1, wherein the address book includes a registration number, a name, an e-mail address, a FAX number, a Uniform Resource Locator, ID numbers, an ID password, a login password, a Simple Mail Transfer Protocol authentication user name, a Simple Mail Transfer Protocol authentication password, a Light Weight Directory Access Protocol authorization user name, a Light Weight Directory Access Protocol authentication password, a user name, and an available operation information.

21. The image forming apparatus as claimed in claim 1, wherein the address book is configured to have at least one link-connected table having data categories including at least one of general data, personal data, and management data.

22. The method as claimed in claim 14, wherein the merging the plurality of process requests further includes integrating multiple modification operations for a same destination during the period between overlapping process requests.

* * * * *